United States Patent
Malinen et al.

(10) Patent No.: US 7,900,242 B2
(45) Date of Patent: Mar. 1, 2011

(54) MODULAR AUTHENTICATION AND AUTHORIZATION SCHEME FOR INTERNET PROTOCOL

(75) Inventors: Jari T. Malinen, Mountain View, CA (US); Timothy J. Kniveton, San Francisco, CA (US); Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 938 days.

(21) Appl. No.: 10/192,753

(22) Filed: Jul. 9, 2002

(65) Prior Publication Data

US 2003/0028763 A1 Feb. 6, 2003

Related U.S. Application Data

(60) Provisional application No. 60/305,123, filed on Jul. 12, 2001.

(51) Int. Cl.
- H04L 29/06 (2006.01)
- H04L 29/00 (2006.01)
- H04L 29/02 (2006.01)

(52) U.S. Cl. .................. 726/6; 726/2; 726/3; 726/4; 726/5; 713/153; 713/156; 455/410; 455/411

(58) Field of Classification Search .................. None
See application file for complete search history.

(56) References Cited

U.S. PATENT DOCUMENTS

| | | | |
|---|---|---|---|
| 5,661,806 A | 8/1997 | Nevoux et al. | 380/25 |
| 5,915,021 A * | 6/1999 | Herlin et al. | 705/67 |
| 6,199,113 B1 | 3/2001 | Alegre et al. | 709/229 |
| 6,223,291 B1 * | 4/2001 | Puhl et al. | 726/28 |
| 6,332,133 B1 * | 12/2001 | Takayama | 705/39 |
| 6,879,690 B2 * | 4/2005 | Faccin et al. | 380/247 |
| 6,954,790 B2 * | 10/2005 | Forslow | 709/227 |
| 7,079,499 B1 * | 7/2006 | Akhtar et al. | 370/310 |
| 7,162,253 B2 * | 1/2007 | Vare et al. | 455/456.2 |
| 7,171,198 B2 * | 1/2007 | Paila et al. | 455/432.1 |
| 7,181,017 B1 * | 2/2007 | Nagel et al. | 380/282 |
| 7,286,671 B2 * | 10/2007 | Yegin et al. | 380/270 |
| 2002/0069278 A1 * | 6/2002 | Forslow | 709/225 |
| 2002/0114469 A1 * | 8/2002 | Faccin et al. | 380/270 |
| 2002/0118674 A1 * | 8/2002 | Faccin et al. | 370/352 |
| 2002/0120844 A1 * | 8/2002 | Faccin et al. | 713/168 |
| 2002/0147820 A1 * | 10/2002 | Yokote | 709/229 |
| 2002/0169953 A1 * | 11/2002 | Moharram et al. | 713/151 |

(Continued)

OTHER PUBLICATIONS

B. Schneier, "Applied Cryptography", 1996, pp. 1-5.

(Continued)

*Primary Examiner* — Syed A. Zia

(57) ABSTRACT

A system and method for three-party authentication and authorization. The system includes an authorizer that authorizes requestors, a client that makes a request, and a local attendant that provides a conduit through which messages between the client and the authorizer pass. The authorizer, the client, and a peer on which the requested resource may be accessed are each in separate domains. A domain is defined as a set of one or more entities such that if the set includes more than one entity, a connection between any two of the entities in the set can be secured by static credentials that are known by each of the two entities. A subscriber identity module (SIM) may be used to generate a copy of a key for the client to be used in accessing a requested resource.

17 Claims, 10 Drawing Sheets

U.S. PATENT DOCUMENTS

| | | | |
|---|---|---|---|
| 2003/0091030 A1* | 5/2003 | Yegin et al. | 370/352 |
| 2003/0176188 A1* | 9/2003 | O'Neill | 455/433 |
| 2003/0226037 A1* | 12/2003 | Mak | 713/201 |
| 2004/0034502 A1* | 2/2004 | Jung | 702/178 |
| 2004/0199768 A1* | 10/2004 | Nail | 713/169 |
| 2005/0078824 A1* | 4/2005 | Malinen et al. | 380/247 |
| 2005/0232429 A1* | 10/2005 | Chowdhury et al. | 380/277 |
| 2006/0073811 A1* | 4/2006 | Ekberg | 455/411 |
| 2007/0124490 A1* | 5/2007 | Kalavade et al. | 709/230 |
| 2009/0076966 A1* | 3/2009 | Bishop et al. | 705/67 |

OTHER PUBLICATIONS

Rigney et al., "Remote Authentication Dial in User Service (RADIUS)", *RFC2138*, Apr. 1997, 49 pages.

Yingchun et al., "Mechanism to Support CHAP Mobile Node Authentication for RADIUS/DIAMETER Hybrid AAA Networks", *draft-ietf-mobileip-radius-challenge-00.txt*, Jun. 1999, pp. 1-8.

Perkins et al., "AAA for IPv6 Network Access", *draft-ietf-perkins-aaav6-00.txt*, Mar. 10, 2000, 13 pages.

Adoba et al., "RADIUS and IPv6", *draft-adoba-radius-ipv6-05.txt*, Jan. 2001, 14 pages.

Asokan, N., et al., "AAA for IPv6 Network Access", Nokia, Nov. 12, 2000, pp. 1-3.

Dupont, Francis, et al., "AAA for mobile IPv6", Internet Engineering Task Force, INTERNET DRAFT, Nov. 20, 2001, pp. 1-13.

European Office Action received for EP Application No. 02749143.0, mailed on Aug. 27, 2010, 7 pages.

Glass, S. et al., "Mobile IP Authentication, Authorization, and Accounting Requirements", Network Working Group, RFC 2977, Oct. 2000, pp. 1-23.

Haverinen, H., "GSM SIM Authentication and Key Generation for Mobile IP", Mobile IP Working Group, Internet Draft, Nokie, Apr. 2001, pp. 1-21.

\* cited by examiner

MODULAR AUTHENTICATION AND AUTHORIZATION SCHEME FOR INTERNET PROTOCOL

RELATED APPLICATION

This application is a Utility Patent application based on a previously filed U.S. Provisional Patent application, U.S. Ser. No. 60/305,123 filed on Jul. 12, 2001, the benefit of the filing date of which is hereby claimed under 35 U.S.C. §119(e).

FIELD OF THE INVENTION

This invention relates generally to network authorization and authentication and more specifically, to a system and method for three-party authentication and authorization for IPv6.

BACKGROUND

At the time of the filing of the U.S. provisional patent application upon which this application claims priority, in the Internet Protocol version 6, no timely support existed for authorization using three-party trust model with a mobile client, the authorizer, and a server or service each residing in a separate security domain. This was also the case for smart-card based authorization of network-layer services using IPv6 network-level protocols. Practical deployment of publicly used resources requires that network-level services such as network access or network identity (IP address) usage be authorized for users willing to pay for these services.

Authorization and authentication in the Internet Protocols traditionally employ a two-party trust model. With network access authorization, e.g., dialup services, clients are authorized with protocols like Radius, where the client and the provider are the two parties, or DIAMETER-based authorization of, e.g., Mobile IP or Mobile IPv6-based access, where a client and the routing identity provider (home domain) are the two parties involved. A two-party trust model may be considered a special case of the three-party model, e.g., when the service provider and the authorizer collapse into one entity.

In both of the protocols identified above, keys are negotiated directly between the client and the service owner. In the Internet Key Exchange (IKE), this two-party model is assumed, even though trust is delegated by a Public Key Infrastructure (PKI) where a trusted third party provides keys for secure key exchange. The keys issued under this model are used for securing a key exchange channel. The keys are not associated with requesting a particular service. The availability of a public key does not represent authorization of a service by a third party issuing or making the key available. A user can get a key for securing channel for session key exchange, but the party providing the channel key has no control over the purpose of the key negotiated through this channel.

SUMMARY

A system and method are provided for three-party authentication and authorization. The system includes an authorizer that authorizes requestors, a client that makes a request, and a local attendant that provides a conduit through which messages between the client and the authorizer pass. The authorizer, the client, and a peer on which the requested resource may be accessed are each in separate domains. A domain is defined as a set of one or more entities such that if the set includes more than one entity, a connection between any two of the entities in the set can be secured by static credentials that are known by each of the two entities. A subscriber identity module (SIM) may be used to generate a copy of a key for the client to be used in accessing a requested resource.

Aspects of the invention introduce a three-party trust model that is applied to IPv6. A client requests a service, an authorizer grants use of that particular service, and a service provider allows this use. The three-party model means that an authorizer can grant use of several services of different providers for many users while residing anywhere in the network with respect to the other parties. In this invention, the three-party model is applied to IPv6 protocols. In the three-party model, an authorizing third party knows, and, e.g., by issuing temporary key material, authorizes a particular service.

In one aspect of the invention, the static credentials may include a key and/or a mutually known algorithm. The static credentials may be used to secure a communication between two entities. For example, a key and an asymmetric encryption algorithm that uses the key might be used to encrypt messages sent between two entities that know the key and algorithm.

In another aspect of the invention, the client employs a SIM that includes credentials for use in authenticating the client to another device. While an authorizer may send a copy of the key to a peer for use in a session with the client, the client may use the SIM to generate its own copy of the key.

In another aspect of the invention, the peer may do one or more of many things. For example, it may provide access to a network, it may provide a service to the client (e.g., act as a server), it may be a home agent of the client, etc. The client may be a mobile node such as a cellular telephone, mobile device including a processor, etc. The local attendant may be, for example, an access router, an Internet Protocol version 6 router, etc. and may communicate with one or more local AAA servers.

In another aspect of the invention, a method for authentication and authorization is disclosed. In the method, an identity associated with a client is sent to an authorizer. The authorizer generates a challenge using the identity. The challenge is sent to the client. The client generates a response that is sent back to the authorizer. The authorizer compares the challenge to the response. If the response is correct, the authorizer transfers a key to a device providing a service to the client. The client automatically generates a copy of the key by employing a SIM associated with the client.

These and various other features as well as advantages, which characterize the present invention, will be apparent from a reading of the following detailed description and a review of the associated drawings.

DETAILED DESCRIPTION

Figure 1:
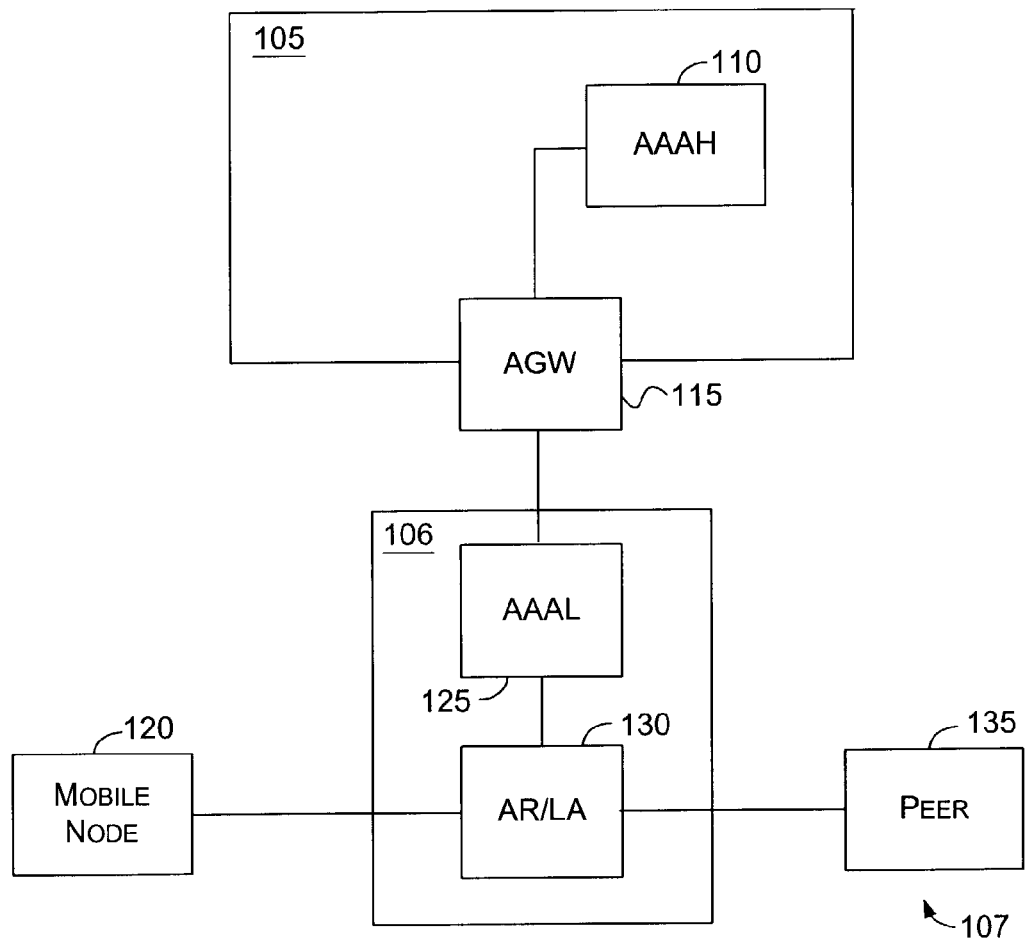
FIG. 1 shows an exemplary network topology in which the invention may be practiced.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In the following description, the architectural nature of a modular authentication and authorization support protocol as well as ways of providing a set of specific protocol modularity principles and their embodiments in a three-party trust model case are described. After a careful review of the description below, it will be recognized that the principles disclosed herein may be used to provide authorization for many potentially mobile clients of a ubiquitous IPv6 network service in a fast, scalable, and resource-efficient way, without necessarily forming any trust relationship with those mobile clients when they appear on the network. Instead, a service provider may rely on its trust relationship with an authorizer, and thus the service provider may defer responsibility for authorizing the client to whatever method the authorizer uses. The service provider may consider the result of this authorization process as sufficient to begin providing service to the client.

The three party trust model described herein may also allow an entity, such as a financial institution or a network operator, an opportunity to authorize specific services. Such an entity might have, for example, a well-developed authorization infrastructure, e.g., by using widely distributed smart cards. The three party trust model may be used to allow a provider of services to grant a service without using its own authorization infrastructure.

The three party trust model described herein also improves scalability. A two-party model typically requires a pre-existing setup of configuration of authorization data (e.g. user identity and particular service) for each client-server pair. The three party trust model described herein does not require an a priori arrangement at a service provider, with each service being authorized, since it can rely on an existing third-party authorization infrastructure.

It will be recognized that the existing three-party scheme using a public key infrastructure (PKI) is different from that disclosed herein. In the PKI scheme a third party which distributes keys does not have any knowledge of the services being used by the client, nor is it empowered to authorize the provision of those services by the service provider. Under the PKI scheme's operational paradigm, rules for authorizing services are implicitly deferred to the service provider. Embodiments of this invention, on the other hand, allow a trusted third party to explicitly authorize named services for specific entities during an initial message exchange.

In the following description, first acronyms and abbreviations of terms found throughout this document are given. Then, some terms that used throughout this document are described. Then, the concept of three party conceptual models is described in more detail. Then, a system is shown that illustrates a three party model in operation. Next, some exemplary applications of the three party conceptual model are described. Next, some exemplary signaling that may occur between components involved in an embodiment of the invention is described. Next, data structures that may be used to send information are discussed. Finally, an illustrative method for using a three party model is disclosed.

Acronyms/Abbreviations

Following are some acronyms/abbreviations that are used throughout this application.

AAA—Authentication, Authorization, and Accounting
AAAL—Local AAA Server
AR/LA—Access Router/Local Attendant
AGW/AAAH—Authentication Gateway/AAA Home Server
BAck—Mobile IPv6 Binding Acknowledgement
BU—Mobile IPv6 Binding Update
CN—Mobile Correspondent Node, typically IPv6
CR—Credentials (EAP/SIM Start)
EAP—Extensible Authentication Protocol
GKm—Generate locally MN instance of session key from SIM
GSM—Global System for Mobile Communications
HA—Mobile IP Home Agent
ID—Mobile Node Network Access Identifier
ICMPv6—Internet Control Message Protocol version 6
IKE—Internet Key Exchange
IMSI—International Mobile Subscriber Identifier
IPv6—Internet Protocol version 6
KR—AAAv6 Key Reply
LC—Local Challenge
mSRES—EAP/SIM MAC of System Response
MAC—Message Authentication Code
MN—Mobile Node, typically IPv6
nRAND—EAP/SIM Challenge
PKI—Public Key Infrastructure
PPP—Point to Point Protocol
RPI—Replay Protection Indicator
RTSOL—ICMPv6 Router Solicitation
SIM—Subscriber Identity Module
SKn—Store the received network instance of the session key
STAT—Returned status of authorization Terms Following are some terms that are used throughout this application.

Challenge: A random number provided by the initiator to verify that a message containing the returned challenge is sent by the recipient of the challenge. Randomness in the challenge provides freshness to ensure that the returned message cannot be replayed.

GSM Authentication: Authentication procedures in the Global System for Mobile communications.

IMSI: International Mobile Subscriber Identifier; used in GSM to identify subscribers.

EAP: Extensible Authentication Protocol, an authentication protocol used with PPP to have a flexible enough authentication extension for multiple authentication methods.

NONCE_MT: A nonce sent from the mobile node to an authenticator. A nonce is a random number sent from one endpoint to another for associating sessions or security transactions when receiving subsequent messages. The purpose is to prevent attacks where recorded protocol messages can be reused for attacking. Using a nonce which is always changed for each transaction is one way to prevent such replay attacks.

SIM: Subscriber Identity Module, a chip usually found in cellular phones identifying the user to the operator and containing credentials and algorithms for authentication.

Other terminology in this application is intended to conform to terminology used in IPv6, Mobile IPv6, AAA, and other Internet protocols.

Three Party Conceptual Models

Figure 8:
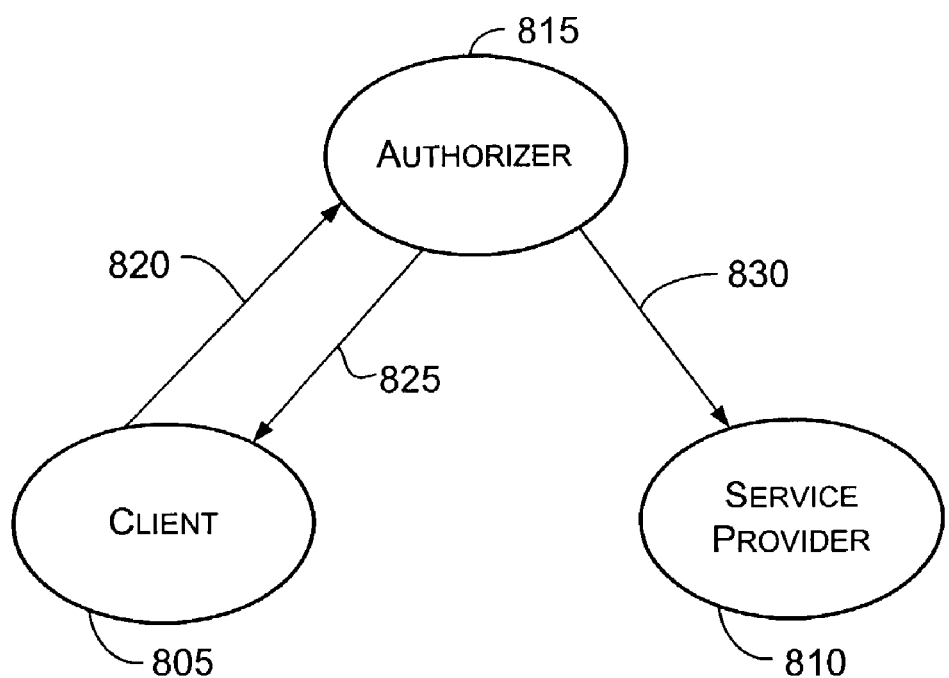
FIGS. 8-9 show components of an exemplary environment in which the invention may be practiced.
Figure 9:
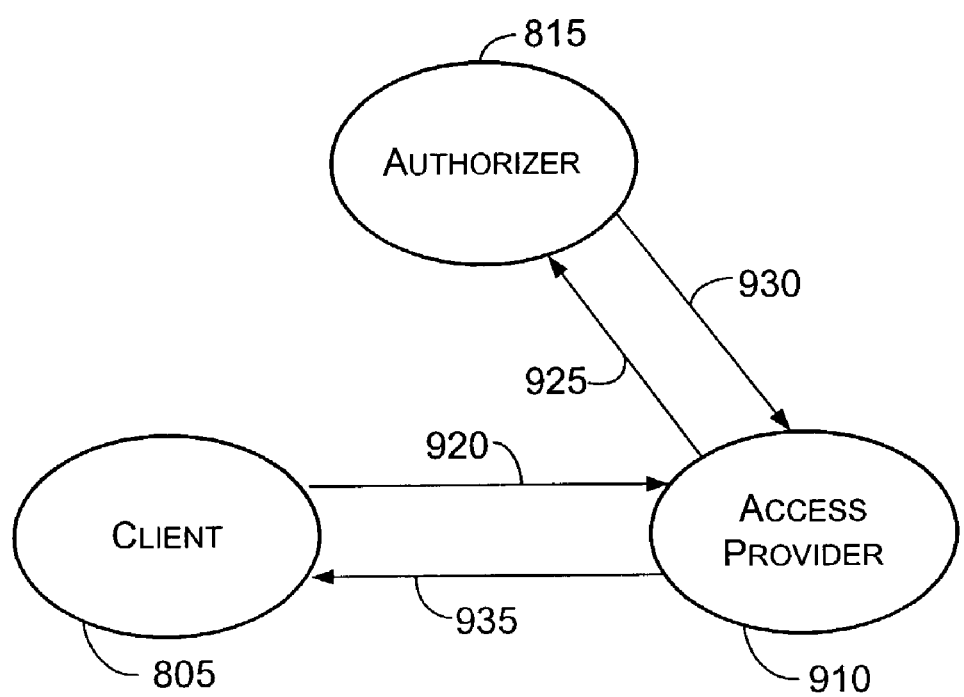

FIGS. 8-9 show components of an exemplary environment in which the invention may be practiced, according to one embodiment of the invention. Both figures show a three-party conceptual model. FIG. 8 shows client 805, authorizer 815, server provider 810, request 820, acknowledgment 825, and grant 830. Client 805, authorizer 815, and provider 830 are connected to each other over one or more network (not shown) that may include wired and/or wireless components and that may be switched and/or packet based.

Client 805 sends request 820 to authorizer 815. Request 820 may be, for example, a request for services found on provider 810. If authorizer 815 determines that client 805 is authorized to the services requested, authorizer 815 grants the service by sending an acknowledgment to client 805 and notifying server provider 810 of a session key with which it may communicate with client 805.

FIG. 9 shows client 805, access provider 910, authorizer 815, request 920, request 925, grant 930, and acknowledgment 935. Again, client 805, authorizer 815, and access provider 910 are connected to each other over one or more network (not shown) that may include wired and/or wireless components. The communications between the components shown in FIG. 9 may be switched and/or packet based.

Client 805 desires network access from authorizer 815. Client 805 requests network access from authorizer 815 via access provider 910. Authorizer 815 provides the granting in the form of a session key (not shown). This key is transported to access provider 910, and acknowledgement 935 is provided to client 805. Client 805 may use acknowledgement 935 to generate an instance of the session key. After this, client 805 can use its own generated instance of the session key for secure communication with access provider 910.

The three-party principle may be applied in a protocol, SIM6, which uses a Subscriber Identity Module, or SIM card, to bootstrap a dynamic security association from an operator's network. Thus, a mobile node arriving at an IPv6 network can be authorized for services by reading its Global System for Mobile Communications (GSM) identity (IMSI) from the SIM card and sending a SIM6 request to the authorizer in the GSM network over the Internet using, for example, the Internet Protocol version 6 (IPv6) protocol. The authorizer then sends a challenge that the client processes in its SIM card. The SIM card then provides a session key for the mobile node, and a response that is sent back to the authorizer. By receiving a valid response, the authorizer acknowledges the client, and generates the same session key that it provides to the service provider.

After this exchange, a provider such as an access provider or a server provider and a client share a temporary session key. This key provides a security association between the client and the provider, enabling the provider to deliver the authorized service(s).

In one embodiment of the invention, the SIM6 protocol (described in more detail below) applies the three-party model above by communicating between the mobile node (MN), the local attendant (LA), and the authorizer, also called as the authentication gateway (AGW). The mobile node arrives at a visited domain and asks permission to use a service, such as access to a network.

In an embodiment of the invention, an implemented protocol uses Internet Control Message Protocol for IPv6 (ICMPv6), with extensions, to carry the signaling messages between the three parties. The service provider and authorizer functionality may be implemented as part of a router operating system, and the client functionality may be implemented as an addition to an operating system such as Linux. Given the specification of the SIM6 protocol, embodiments of the invention could also be implemented by other parties using various operating systems in such a way that the implementations are cross-compatible and interoperable.

Below, authorization of services in IPv6 for a mobile node using a SIM is described. The existence of a large number of SIM modules with an associated trust infrastructure provides a widespread existing mechanism for scalable trust delegation. Introduction of totally new mechanisms for IP-based trust delegation is expensive. Leveraging an existing SIM-based mechanism for IPv6 can be achieved by extending the AAAv6 protocol as described below. This extension to AAAv6 functionality can be made optional. For example, it may be revoked as described in more detail below.

When using a hardware-based mechanism, such as a SIM module, for authorizing and authenticating client with a service, bootstrapping of a dynamic trust relationship can be automated so that little or no manual configuration is needed. Services like Mobile IPv6 can benefit from such a mechanism in that, for example, no static mobile-home security association configuration is needed. The presented system and method may be applicable to bootstrapping a security association between mobile node and home agent, or mobile node and an access link router. The system and method may also be used for bootstrapping other services.

FIG. 1 shows an exemplary network topology in which the invention may be practiced, according to an embodiment of the invention. The network topology includes AAA home (AAAH) server 110, authentication gateway 115, mobile node 120, AAA local (AAAL) server 125, access router/local attendant (AR/LA) 130, and peer 135. These components may be distributed over three domains, e.g. 105, 106, and 107. For example, authorization may be provided by components in domain 105, access may be provided by components in domain 106, and services may be provided by components in domain 107. Usually, the authorizing domain is a network of an entity that issued the SIM module. The SIM6 protocol described does not require changes to network entities in an IPv6 network or in a cellular network. Neither does the protocol require changes to existing SIM authentication principles.

In one embodiment of the invention the functioning of some of the elements shown in FIG. 1 is changed from what would occur in a typical network. For understanding the protocol described in more detail below in conjunction with FIGS. 2-7, mobile node 120 has an extension to its router discover. This extension allows mobile node 120 to understand and receive a local challenge. Mobile node 120 also has an extension to AAAv6 signaling that enables the node to recognize SIM6 EAP types and protocol states. In addition, mobile node 120 maintains an authentication session context state.

AR/LA 130 is changed to be able to extend a local challenge in the router advertisement. AR/LA 130 also includes an extension to its AAAv6 signaling that enables it to recognize SIM6 EAP types and protocol stages. In addition, AR/LA maintains an authentication session context state for each mobile node as well as a most recently sent local challenge cache for replay protection.

Authentication gateway 115 typically resides at the border of an IP network and a cellular domain. Authentication gateway 115 is capable of communicating with an authorization center in the cellular network of the issuing operator. Authentication gateway 115 is changed to understand the EAP extension and key reply extension in the protocol discussed in greater detail below. Authentication gateway 115 maintains an authentication session context state for each mobile node and is able to query the RAND, SRES, and session key elements for a received IMSI from a local authorization database, from the GSM network, or from another authentication gateway.

SIM Authentication may use Extensible Authentication Protocol (EAP) messages as a modular key distribution extension to AAAv6. The use of EAP allows for adding other similar extensions over AAAv6 as understood by those skilled in the art.

In SIM authentication, an access router provides a local challenge which is returned by the mobile node in the first key request. Then, a mobile node transmits its International Mobile Subscriber Identifier (IMSI) in a key request to an authentication gateway. The authentication gateway returns a SIM challenge to the mobile node which responds with a SIM response in the second message, computed locally by the SIM module. The key request, SIM challenge, and SIM response are EAP messages inside AAAv6.

If the response matches one locally known by the authentication gateway, a session key is finally returned in a key reply. While mobile node has a local SIM-generated session key, the other instance of the session key is provided in the key reply to its user, typically an access or service provider. This user is called the peer. A peer can be, for example, an access router, a server providing a service, a home agent of the mobile node and provide a mobility service, or any other entity with which the mobile node can communicate. Since the mobile node locally creates its copy of the session key, no key material is transported over the access link to the mobile node.

Application of the provided temporary session key pair can be authentication with the access router, last hop encryption, or authentication with Mobile IPv6 home agent, depending on the purpose of authorization. This application can be negotiated between a mobile node and an AGW. Signaling using the session key, e.g. Mobile IPv6 binding update, can take place parallel to the key distribution, so that a minimal number of signaling roundtrips may be achieved.

Some authentication systems using a SIM module typically only produce a key 64 bits long. In one embodiment of the invention, a set of n SIM challenges, responses, and session keys may be used to create a key. Thus, the generated session key can be longer, e.g. n times 64 bits. A recommended value for n is 2.

A session key is a value K, computed from the SIM-generated n session keys Kn, by a pseudo-random function, e.g., PRF(n*Kc, n*RAND|IMSI| NONCE_MT). This way the original SIM-generated Kc keys are not exposed while using them. Also, the client who generates a random number (NONCE_MT) can know that the information leading to the generation of K was properly replay-protected. Embodiments of the invention use HMAC-MD5-96 and HMAC-SHA-1-96 as pseudo-random functions. These pseudo-random functions may also be used in the message authentication code (MAC) fields, as described below.

Local Attendant Operation

In operation, a local attendant, such as AR/LA 130, modifies its router advertisement. The local attendant is involved in at least two message exchanges with a mobile node. First, it receives an AAAv6 request. Then, it replies with an AAAv6 reply.

Sending Local Challenge to the Mobile Node

A local attendant creates a local challenge by extracting a value generated by a good random generator. The local attendant sends a local challenge in each router advertisement. Ideally, the local attendant should maintain a local challenge cache of three most recently advertised challenges to each mobile node. When the local challenge cache includes its maximum number of recent router advertisements and needs to cache a new router advertisement, the local attendant deletes the oldest challenge together with its associated state from the local challenge cache.

When a local attendant receives an AAAv6 request from a mobile node, it creates an AAAv6 context in which it stores the identifier of the mobile node as well as the local challenge. Then, it compares the received challenge against those in the set of recently sent challenges to see if a mobile node has already used the challenge.

Receiving SIM/Start from the Mobile Node

If the challenge is not found or has already been used by a mobile node, the attendant silently drops the packet and destroys the context. This is done to counter a possible replay attack. If the challenge was found and unused for this mobile node, the attendant marks the challenge as used and proceeds.

The local attendant then creates and attaches a mobile node SIM6 context to a mobile node AAAv6 context. There is one AAAv6 context and one SIM6 content for each mobile node. In the AAAv6 context, the local attendant stores the following items: version of the protocol, key lifetime proposal, reason for the key exchange, and a NONCE_MT created by the mobile node.

If all the needed data elements were present in the message received, the local attendant forwards the identifier and credentials of the mobile node towards an AGW. This AGW may be chosen from a priority list of AGWs that are keyed by a realm part of the identifier. Configuration of this list may represent administratively configured cross-domain trust relationships, e.g. roaming agreements.

The credentials in a message include elements of the EAP object. The core protocol should carry an unmodified EAP object, associated with the identifier, to the chosen AGW.

The local attendant then waits for a reply from the chosen AGW for a selected number (SIM6_TIMEOUT_AGW) of seconds. If no reply is received in time, or an error is received, the local attendant destroys the context for the mobile node. In case of failure, prior to destroying the context, the local attendant should try to send the message again a selected number (SIM6_MAX_RETRIES) times. The local attendant may repeat this for each member in a priority list of AGWs. If a lower-priority AGW replies, its priority on the list may be temporarily elevated above those of the failed AGWs.

Sending a SIM/Challenge to the Mobile Node

If the local attendant receives a reply from the gateway containing nRAND for the mobile node, it sends a SIM/Challenge to the mobile node. After receiving a reply including nRAND from an AGW, the local attendant searches for the mobile node's context based on the identifier received from the AGW. If no context is found, the packet is discarded.

In case a context was found, the local attendant creates a SIM/Challenge EAP packet and sends it to the mobile node in an AAAv6 reply. The AAAv6 reply first contains the identifier, after which it contains the EAP object with the nRAND and the key lifetime decided by the authorizing AGW. The EAP object is protected by the MAC_RAND field which covers the nRAND, the NONCE_MT in the mobile node's context, and the lifetime. The core protocol should get this EAP object unmodified, together with the identifier, from the AGW.

The local attendant sets a timer for a selected amount of time (SIM6_TIMEOUT_MOBILE). The timer is associated with the mobile node's context. The time is set in expectation of receiving a second AAAv6 request with SIM/Challenge from the mobile node. If no request is received in time, the mobile node's context is destroyed. In case of failure, prior to destroying the context, the local attendant should try sending the message again a selected number (SIM6_MAX_RETRIES) times.

Receiving a SIM/Challenge from the Mobile Node

After receiving the second AAAv6 request with a SIM/Challenge from the mobile node, the local attendant searches for the mobile node's context based on the identifier received from the mobile node. If no context is found, the packet is discarded.

In case a context was found, the local attendant creates a message to the AGW where it inserts the identifier and the information received in the EAP object. The local attendant then waits for a reply from the AGW for a selected number (SIM6_TIMEOUT_AGW) of seconds. If no reply is received in time, or an error is received, the local attendant destroys the context for the mobile node. In case of failure, prior to destroying the context, the local attendant should try sending the message again to the AGW a selected number (SIM6_MAX_RETRIES) of times. If the local attendant receives a message containing a key reply for the mobile node, it sends an AAAv6 Key Reply to the mobile node.

If the generic key reply received from the AGW also contains a session key for access link authentication or encryption, the local attendant extracts this key and stores it in its security database.

Sending a Key Reply to the Mobile Node

The local attendant finally sends an AAAv6 reply to the mobile node. The AAAv6 reply includes a key reply. Success status is inserted into the Code ICMPv6 field. Key Security Parameter Index (SPI) is inserted in to the key field. The key reply, success status, and key SPI are received from the AGW. After this, the authentication session is completed and the mobile node's context is destroyed.

Mobile Node Operation

A mobile node, such as mobile node 120, receives a modified router advertisement from a SIM6 capable access router/local attendant, such as AR/LA 130. Then, the mobile node is involved in two message exchanges with the attendant and an AGW, such as AGW 115. In the first exchange, the mobile node sends an AAAv6 request. In the second exchange, the mobile node receives an AAAv6 reply.

Receiving a Local Challenge from the Attendant

When a randomized local challenge is sent in a router advertisement, the mobile node recognizes that the router supports local attendant functionality. The mobile node can then, at any suitable time, start a SIM6 authentication procedure, e.g. when network access authorization is needed. A flag in a router's advertisement, for example, may indicate to other nodes support for SIM6 authentication.

Sending SIM/Start to the Attendant

When a mobile node starts a SIM6 authentication procedure, it creates a SIM6 context into which it extracts its IMSI from the SIM card hardware as a user part of a NAI identifier. The mobile node then gets an administratively configured realm portion for the NAI by which an AGW, which understands the IMSI, can be reached. The mobile node then adds to the context a reason for the session key requested, a key lifetime proposal, and a NONCE_MT from a good random source.

The mobile node then creates a SIM/Start EAP packet and sends it to the attendant in an AAAv6 request. The AAAv6 request first contains the returned local challenge, the identifier, and the EAP object with the key lifetime proposal and the NONCE_MT.

The mobile then sets a timer for a selected amount of time (SIM6_TIMEOUT_MOBILE) for the context. This timer is set in expectation of receiving the first AAAv6 reply with SIM/Challenge from the attendant. If no request is received in time, the mobile node's context is destroyed and the authentication is considered failed. Prior to destroying the context, the mobile node should try repeating the authentication for a selected number (SIM6_MAX_RETRIES) times. The mobile node may do so by restarting from the beginning of the procedure. In doing so, the mobile node may reset the context and increment a failure count. Then, the mobile node may send a SIM/Start.

For each repeated attempt, a new local challenge is obtained. If the router advertisement frequency is too low, a router solicitation should be issued prior to every repeated attempt.

Receiving SIM/Challenge from the Attendant

After receiving the first AAAv6 reply with a SIM/Challenge from the attendant, the mobile node searches for a context based on the identifier received in the message from the attendant. If no context is found, the packet is discarded.

If a context was found, the mobile node extracts the n RANDs from the received message and applies these to the SIM hardware. The mobile node then stores the n session keys and SRES responses to n triplets into the context.

Sending SIM/Challenge to the Attendant

The mobile node then creates a SIM/Challenge EAP packet and sends it to the attendant in an AAAv6 request. The AAAv6 request first contains the identifier, after which it contains the EAP object with the MAC_SRES.

The mobile then sets a timer for a selected amount of time (SIM6_TIMEOUT_MOBILE) for the context. The timer is set in expectation of receiving a Key Reply from the attendant. If no message is received in time, the mobile node's context is destroyed and the authentication is considered failed. Prior to destroying the context, the mobile node should try repeat the authentication a selected number (SIM6_MAX_RETRIES) of times. The mobile node may do so by restarting from the beginning of the procedure. In doing so, the mobile node may reset the context and increment a failure count. Then, the mobile node may send a SIM/Start.

Receiving Key Reply from the Attendant

When receiving a key reply from the attendant, the mobile node searches for a context based on the identifier received in the message from the attendant. If no context is found, the packet is discarded. Also, if the status received in the ICMPv6 Code field is other than success, for example, AAAV6_STATUS_SUCCESS, the authentication is considered failed.

In case of failure, prior to destroying the context, the mobile node should try repeat the authentication a selected number (SIM6_MAX_RETRIES) of times. The mobile node may do so by restarting from the beginning of the procedure. In doing so, the mobile node may reset the context and increment a failure count. Then, the mobile node may send a SIM/Start.

Authentication Gateway Operation

An Authentication Gateway (AGW) is considered a proxy AGW if it communicates with another AGW; otherwise it is considered an authorizing AGW. The latter may communicate with an AAAH in a GSM network, or locally authorize the session making it also an AAAH.

An AGW, such as authentication gateway 115, is involved in two message exchanges with a mobile node, such as mobile node 120, via the attendant, such as AR/LA 130. The AGW first receives a request message and then responds with a reply message.

Receiving SIM/Start from the mobile node via the Attendant

When the AGW receives a message from the mobile node via the attendant containing a SIM/Start EAP object, it performs various actions. First, the AGW creates a mobile node context where it stores the IP address from which the message was received, the identifier of the mobile node, version of the protocol, key lifetime proposal, reason for the key exchange, and the NONCE_MT created by the mobile node. One context may be created for each mobile node.

If all the needed data elements are present in the message received, the authorizing AGW requests n triplets for the given IMSI from the GSM network or from a local database. If the triplets are successfully received, the authorizing AGW stores them to the mobile node's context and sends a message with a SIM/Challenge to the mobile node.

If all the needed data elements are present in the message received, a proxy AGW (if one is employed) forwards the mobile node's identifier and credentials towards another AGW. The other AGW may be chosen from a priority list of next level AGWs. Configuration of this list may represent administratively configured cross-domain trust relationships, e.g. roaming agreements.

The credentials in the message include elements in the EAP object. The core protocol should carry the unmodified EAP object, associated with the identifier, to the next level AGW.

The proxy AGW then waits for a reply from the AGW for a selected number (SIM6_TIMEOUT_AGW) of seconds. If no reply is received in time, or an error is received, the proxy AGW destroys the context for the mobile node. In case of failure, prior to destroying the context, the proxy AGW should try sending the message a selected number (SIM6_MAX_RETRIES) of times. The proxy AGW may send the message to each member in the priority list of next level AGWs. In case a lower-priority next-level AGW replies, its priority on the list may be temporarily elevated above those of the failed next-level AGWs.

If the proxy AGW receives a reply containing nRAND for the mobile node, it sends a SIM/Challenge to the mobile node.

Sending SIM/Challenge to the Mobile Node via the Attendant

First, an AGW creates a message with the identifier and a SIM/Challenge EAP packet. The AGW then sends this message to the mobile node via the node whose IP address was stored in the context as sender of the request message with SIM/Start.

The created message first contains the identifier. After the identifier, the message includes the EAP object with the nRAND and the key lifetime decided by the AGW as a function of the key lifetime proposal received from the mobile node. The EAP object is protected by the MAC_RAND field which covers the nRAND, the NONCE_MT in the mobile node's context, and the lifetime.

The AGW sets a timer for a selected amount of time (SIM6_TIMEOUT_AGW). The timer is associated with the mobile node's context. The timer is set in expectation of a receiving a second message with SIM/Challenge from the mobile node. If no request is received in time, the mobile node's context is destroyed.

Receiving SIM/Challenge from the Mobile Node via the Attendant

After receiving the second request message with a SIM/Challenge from the mobile node via the attendant, the AGW searches for the mobile node's context based on user part of the identifier (NAI) received from the mobile node. If no context is found, the packet is discarded.

The authorizing AGW then calculates the MAC_SRES locally based on the n session keys, SRES values, IMSI, and NONCE_MT, found in the mobile node's context. If the value computed by the pseudo-random function (PRF) matches that of the one received in the EAP object, a success status is stored in the context, otherwise, an invalid-credentials status is stored.

A proxy AGW then forwards an identifier of the mobile node together with its credentials towards another AGW. This AGW may be chosen from a priority list of next level AGWs. Configuration of this list may represent administratively configured cross-domain trust relationships, e.g. roaming agreements.

The credentials in the message include elements in the EAP object. The core protocol should carry the unmodified EAP object, associated with the identifier, to the next level AGW.

The proxy AGW then waits for a reply from the AGW for a selected number (SIM6_TIMEOUT_AGW) of seconds. If no reply is received in time, or an error is received, the proxy AGW destroys the context for the mobile node. In case of failure, prior to destroying the context, the proxy AGW should try sending the message again a selected number (SIM6_MAX_RETRIES) times. The proxy AGW may try sending the message a SIM6_MAX_RETRIES to each member in the priority list of next level AGWs. In case a lower-priority next-level AGW replies, its priority on the list may be temporarily elevated above those of the failed next-level AGWs.

Sending Key Reply to the Mobile Node via the Attendant

The authorizing AGW finally sends a generic key reply back to the mobile node via the attendant and inserts the success status into the message. After this, the authentication session is completed and the mobile node's context may be destroyed.

In case the mobile node's context also contained a reason for sending a key to the attendant, this key is added to the message as well as a generated key SPI.

The proxy AGW propagates a key reply towards the IP address in the context. Finally, the context should be destroyed after a selected number (2*TIMEOUT_AGW) of seconds.

Applications of SIM Authentication over AAAv6

Applications of SIM Authentication may use the Reason Subtypes of the SIM Start and AAAv6 Key Reply extensions. The numbering of different reasons is such that a combination of reasons can be indicated in a single extension. This enables distribution of the same session key for multiple purposes with one authorization message exchange.

SIM Authentication for Network Access

When using Reason Subtype 1 or 2, SIM Authentication distributes a session key for the access router to be used either for access authentication or access link encryption.

SIM Authentication for Mobile IPv6 Home Registration

When using Reason Subtype 4, SIM Authentication distributes a session key for the home agent to be used for SIM-bootstrapped mobile-home authentication. In this case, a Mobile IPv6 binding update (BU) can be sent as embedded data over the core signaling so that in case of success, the AGW delivers the network part of the session key to the home agent together with the BU. The home agent then authenticates the home registration with the delivered key and responds by sending a binding acknowledgement back as embedded data in the second core signaling reply message.

SIM Authentication for Services

When using Reason Subtype 8, SIM Authentication distributes a session key to a peer. This signaling allows the AGW/AAAH to distribute a network copy of the session key to the host and service identified in the peer NAI.

A service may be identified in a peer NAI in a SIM start option. The NAI encodes location of the peer node in the realm part, and the service in the user part. An example encoding would be "HA@host.domain.com" for identifying mobile-home security association creation to a home agent at DNS name host.domain.com. This encoding might actually be used under Reason Subtype 4. Another example could be "unlock@door101.company.com for providing authorization and a session key to securely use an "unlock" service at a host identified by DNS name door101.company.com. This way, a light IPv6 protocol stack with ICMPv6 but without upper layers may be used, for example, in a control device implementing only a simple application such as opening and closing of a lock.

When an authentication gateway sends a key reply message to a peer node, this key reply message contains the peer identifier option with the NAI, and the peer responds to this key reply with a key acknowledgement. The authentication gateway delays sending the key reply towards the mobile node until it receives the key acknowledgement. The format and protection of the key reply and key acknowledgement are provided by the core network signaling protocol.

With direct ICMPv6 messaging as the core network signaling, the key reply is an AAAv6 request message with an identifier and a key reply option. The identifier contains the peer NAI sent by the mobile node. The key reply contains the encoded session key in a key field.

Figure 7:
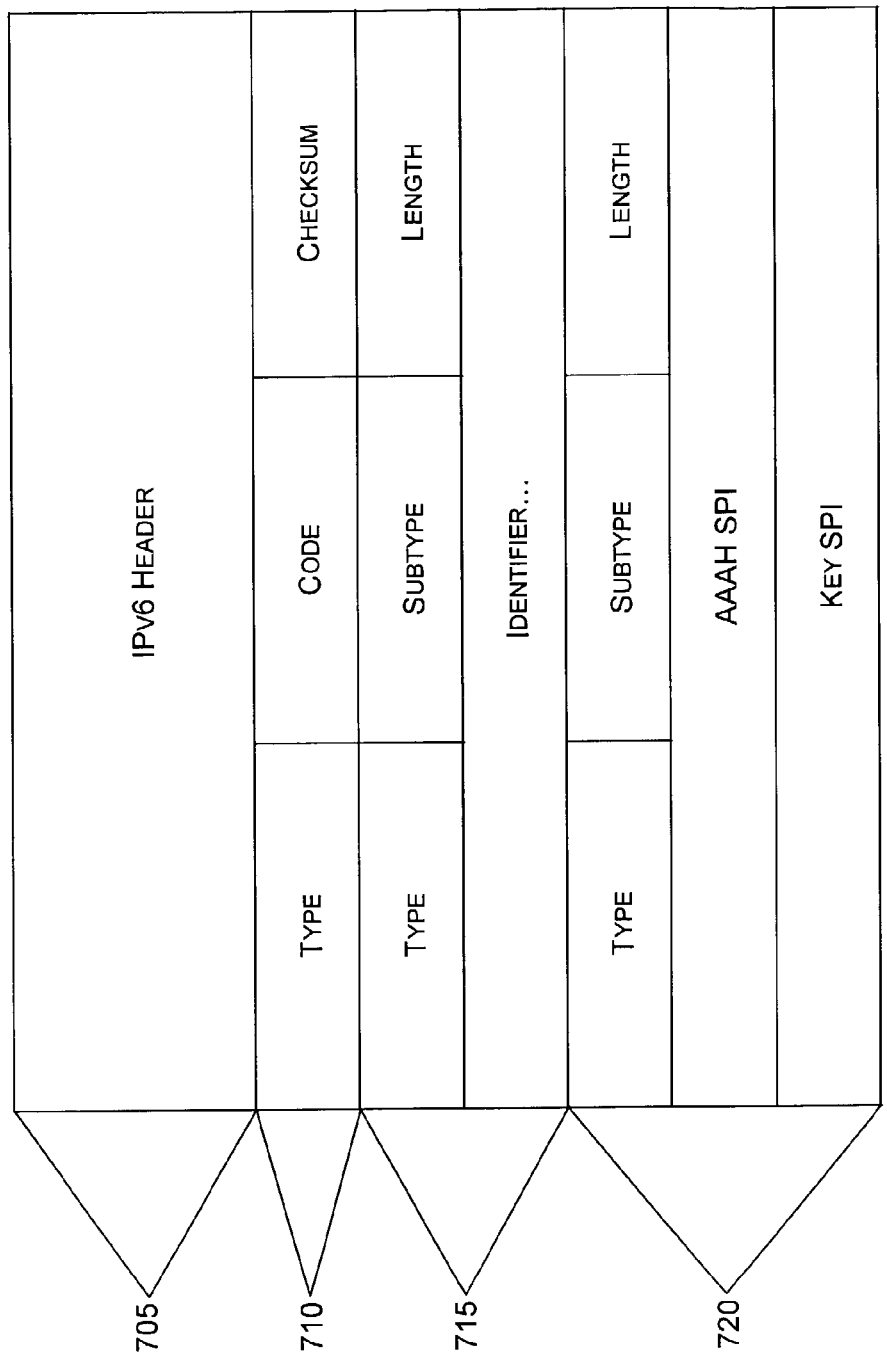
FIG. 7 shows a message that originates at the authentication gateway.

The acknowledgement may be an empty key reply sent to the authentication gateway with the success status encoded into the reply, e.g., the key reply described in conjunction with FIG. 7. The identifier for the acknowledgement would have a NAI encoding as in the peer NAI.

An acknowledgement could be sent to the AGW by relying on IPv6 address stored in peer attendant or proxy AGW states. Alternatively, an acknowledgement could be sent to the AGW by NAI-based routing where the realm part could be used to route the acknowledgement to the authorizing AGW. In the latter case, the acknowledgement routing would be more robust because, for example, its lack of state. An example acknowledgement encoding could be "user-peer%realm_peer@realm_AGW." For example, for the unlock example given above, the acknowledgement might be "unlock%door101.company.com@AGW.domain.com." This may mean, for example, "this is door101 acknowledging to authorizing AGW that the operation has been completed with success status in AAAv6 code field; please forward an acknowledgement to the requesting mobile node." It will be recognized that this is a generalization of mobile node-home agent temporary key push for an arbitrary NAI-encoded service.

Revocation of services may be achieved from the authorizing AGW by sending the acknowledgement as described in conjunction with FIG. 7. This acknowledgement may be sent to both the peer and the mobile node with a code of, for example, AAAV6_INVALID_CREDENTIALS. The peer could also initiate revocation by sending this message to the mobile node via the authorizing AGW. The authorizer would either forward the peer-initiated revocation, or block it, depending on authorizing policy.

NAI encodings for the above messages might follow the rules below. The realm part of the NAI in a key is the realm of the destination for it. This implies that the context state in the proxy AGWs have NAI as the context search structure's key. A special encoding in NAI for the acknowledgement/revocation could be parsed to yield the pending state's ID by dropping all from @ ahead and replacing the % with an @. The context access string could be created %-encoded already when the AAAv6 request is going towards the peer. In this way, two types for key replies to/from peer are not needed to tell when there is a plain NAI or %-encoded NAI.

Protocol Constants

The protocol described herein may use the following constants:

SIM6_MAX_RETRIES, the maximum number of retries in case of various fault cases, may equal 6.

SIM6_TIMEOUT_AGW, the timeout in seconds for core signaling problems, may equal 4.

SIM6_TIMEOUT_MOBILE, the timeout in seconds for access link signaling problems, may equal 2.

These constants may be selected to be other values as well.

Security Considerations

The protocol extensions described herein are not intended to weaken the security provided by AAAv6 and cellular SIM authentication. It will be recognized that the presented extensions use existing protocols so much that security characteristics are inherited from the AAAv6 and cellular SIM authentication protocols.

In embodiments of the invention, secret algorithm or permanent key material for SIM authentication does not get distributed to an IP network. An AGW controlled by an operator is assumed to have trust relationship with the authorizing operators via roaming agreements.

Protocol Operation

Figure 2:
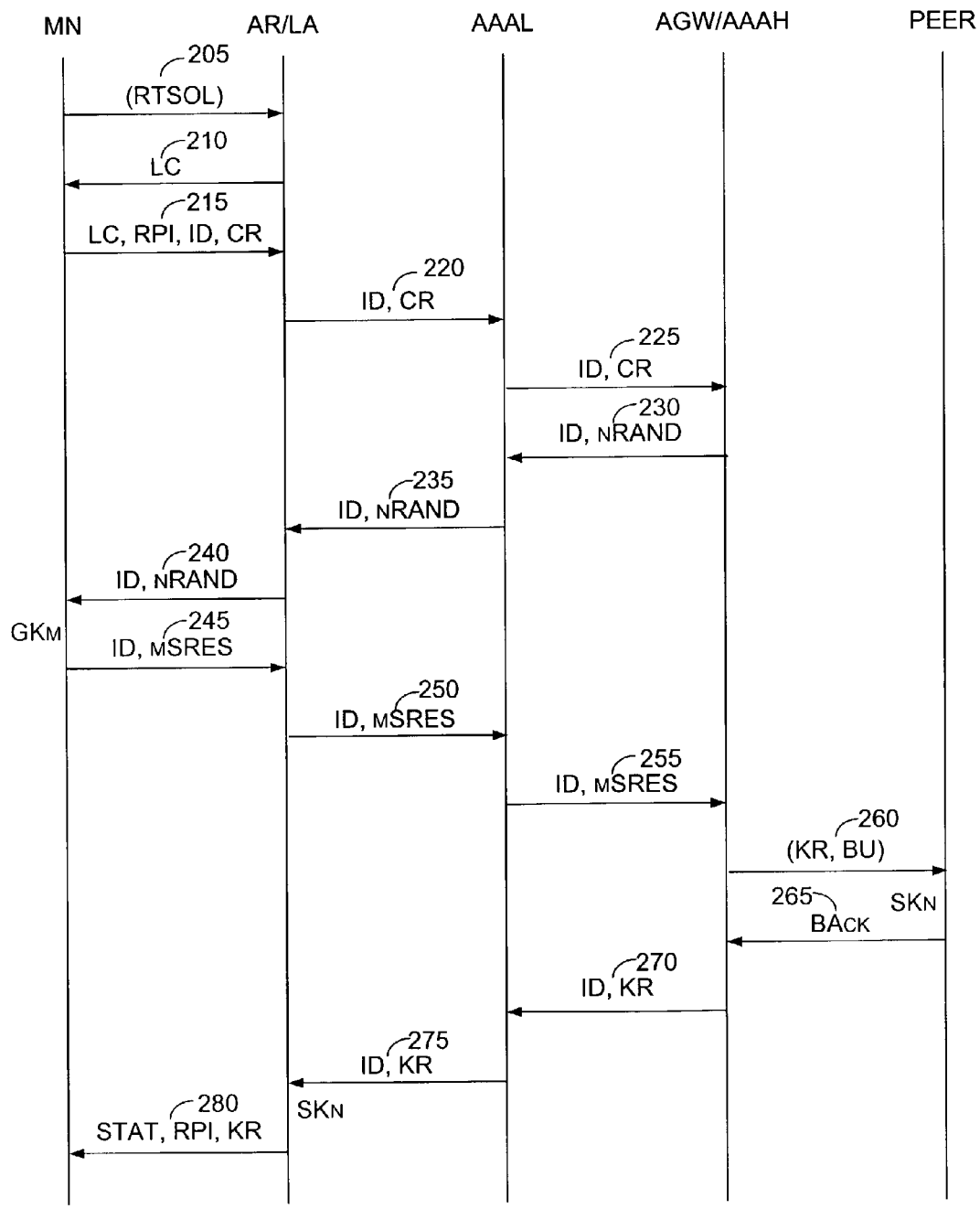
FIG. 2 shows an exemplary signaling that occurs between components that may be used in practicing the invention.

FIG. 2 shows an exemplary signaling that occurs between components that may be used in practicing the invention, according to one embodiment of the invention. The protocol illustrated may be implemented using AAAv6 where an AAAv6 Embedded Data option contains EAP options for SIM Authentication.

The access router sends a local challenge (210) in an unsolicited or solicited (205) router advertisement. This is an option added to the router advertisement when AAAv6 local attendant functionality in the access router is enabled. A local challenge is used for replay protection in the first request by the mobile node.

After receiving a router advertisement with a local challenge, the mobile node returns an AAAv6 request (215). This contains the challenge, together with a registration identity of the mobile node and a SIM key request. The identity is an ID option of AAAv6. The ID contains a Network Access Identifier (NAI) in a format user@realm where the user part is an International Mobile Subscriber Identifier (IMSI), and the realm part enables the AAA cloud to route the signal to the authentication gateway (AGW/AAAH). A special realm (GSMSIM_NAI_REALM) may be used to find the first available authentication gateway.

The SIM key request is an Embedded Data option in the AAA request that contains an EAP Response/SIM/Start. This provides a signal to the local attendant function in the access router to propagate this request together with the NAI to the SIM-aware authentication gateway. The SIM key request also contains a parameter to negotiate lifetime for the session key.

When the local attendant receives a SIM challenge (nRAND) from the authentication gateway, it sends an AAAv6 reply back to the mobile node with the SIM challenge embedded to an EAP Request/SIM/Challenge. The NAI option containing the IMSI is included in the subsequent messages to identify the authentication dialogue in progress.

When the mobile node receives the first AAAv6 reply (240), it invokes the SIM algorithm with the included n random numbers (nRAND) from the message. This generates the n SRES values and a local session key. How big n is depends on how long key is needed. SIM authentication produces a short key of 64 bits but an application may need a longer key.

The second AAAv6 request (245) from the mobile node to the local attendant then contains a hash of the generated SRES, mSRES, computed as the MAC_SRES. This conveys the SRES values back to the authentication gateway in a format from which an eavesdropper cannot extract the actual RAND/SRES value pairs. The AAAv6 request also contains the NAI option.

When receiving the second AAAv6 request, the local attendant forwards the signal (250) to the authentication gateway which verifies the mSRES. If correct, the local attendant will receive a key reply (275) with a success status and potentially with the generated session key. If incorrect, the key reply will contain a failure status.

Finally, the local attendant sends a second AAAv6 reply (280), which contains NAI and a key reply. When receiving the second AAAv6 reply, the mobile node will know whether the SIM authentication succeeded and also contains the chosen purpose for the generated session key.

In another embodiment of the invention, the protocol described herein may be applied to Internet Protocol version 4. This may be done by reserving two ICMP types and replicating the other aspects of the protocol as described herein for IPv6 as is in IPv4. As known by those skilled in the art, a specification for local challenges in IPv4 router advertisements exists among AAA proposals.

Core Network Signaling

A local attendant can use DIAMETER as the core networking signaling used to communicate with the authentication gateway. Alternatively, the core network signaling can use, e.g., Radius or SIM6 messages directly.

Key distribution to a peer such as a home agent may also be performed when requested.

A proxy authentication gateway, as described in greater detail below, provides for multi-hop core network signaling as a fallback or for interoperation. Each hop can use its own protocol so that a proxy authentication gateway translates between different core network signaling protocols. This may prove useful, for example, for transition and migration scenarios.

Protocol Message Format

Following are message exchanged in a SIM6 authentication procedure. The messages shown are generic AAAv6, e.g., special ICMPv6 messages, and as such could be contained in Radius messages, or could be sent over a secure channel as simple ICMPv6 packets. An access link can use non-secure channels, but with plain ICMPv6 packets, a secure communication channel is preferred to maintain security from a local attendant to an authorization gateway.

Figure 3:
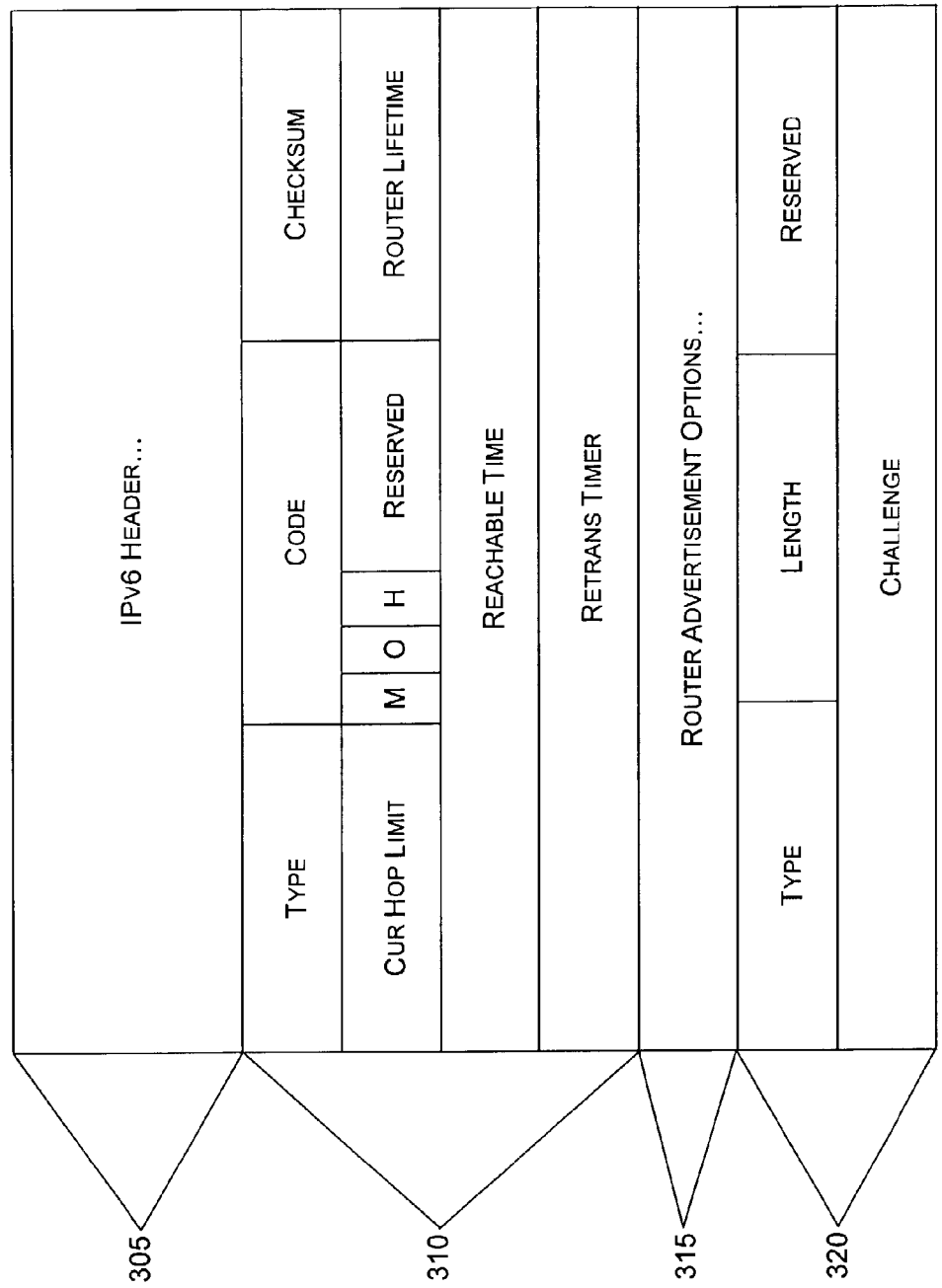
FIG. 3 shows an exemplary router advertisement/local challenge.

FIG. 3 shows an exemplary router advertisement/local challenge, according to one embodiment of the invention. When the mobile node arrives at the visited network, it receives a router advertisement from a local router. This router advertisement might be received as specified by neighbor discovery and Mobile IPv6 protocols as known by those skilled in the art. This router advertisement contains a "challenge," which is essentially a random number used as a nonce for replay protection.

The message includes IPv6 header 305, router advertisement 310, router advertisement options 315, and AAAv6 challenge option 320. Router advertisement 310 may include type, code, checksum current hop limit, reserved fields, router lifetime, reachable time, retransmit timer, and other fields. Router advertisement options 315 may include target link-layer address, prefix information options, and other fields. AAAv6 challenge option 320 may include type, length, challenge, reserved fields, and other fields.

It will be recognized that the structure shown in FIG. 3 is similar to a normal router advertisement an access router/local attendant sends, but includes additional options. The additional options include AAAv6 challenge option 320. In one embodiment of the invention, AAAv6 challenge option 320 fields have a particular representation. For example, a value of 9 in the type field may indicate that AAAv6 challenge option 320 includes an ICMPv6 Router Advertisement Local Challenge Option. A value of 1 in the length field may indicate that the length is 8 octets including the type and length fields. The reserved field may be ignored. The challenge field may include a 32-bit random number generated by the access router. This 32-bit number may be used to prevent replay attacks.

When the mobile node arrives at the visited network, it receives a router advertisement as specified by Neighbor Discovery protocols and modified by Mobile IPv6 from the local router. This router advertisement, as shown in FIG. 3, contains a "challenge," which is essentially a random number used as a nonce for replay protection.

Figure 4:
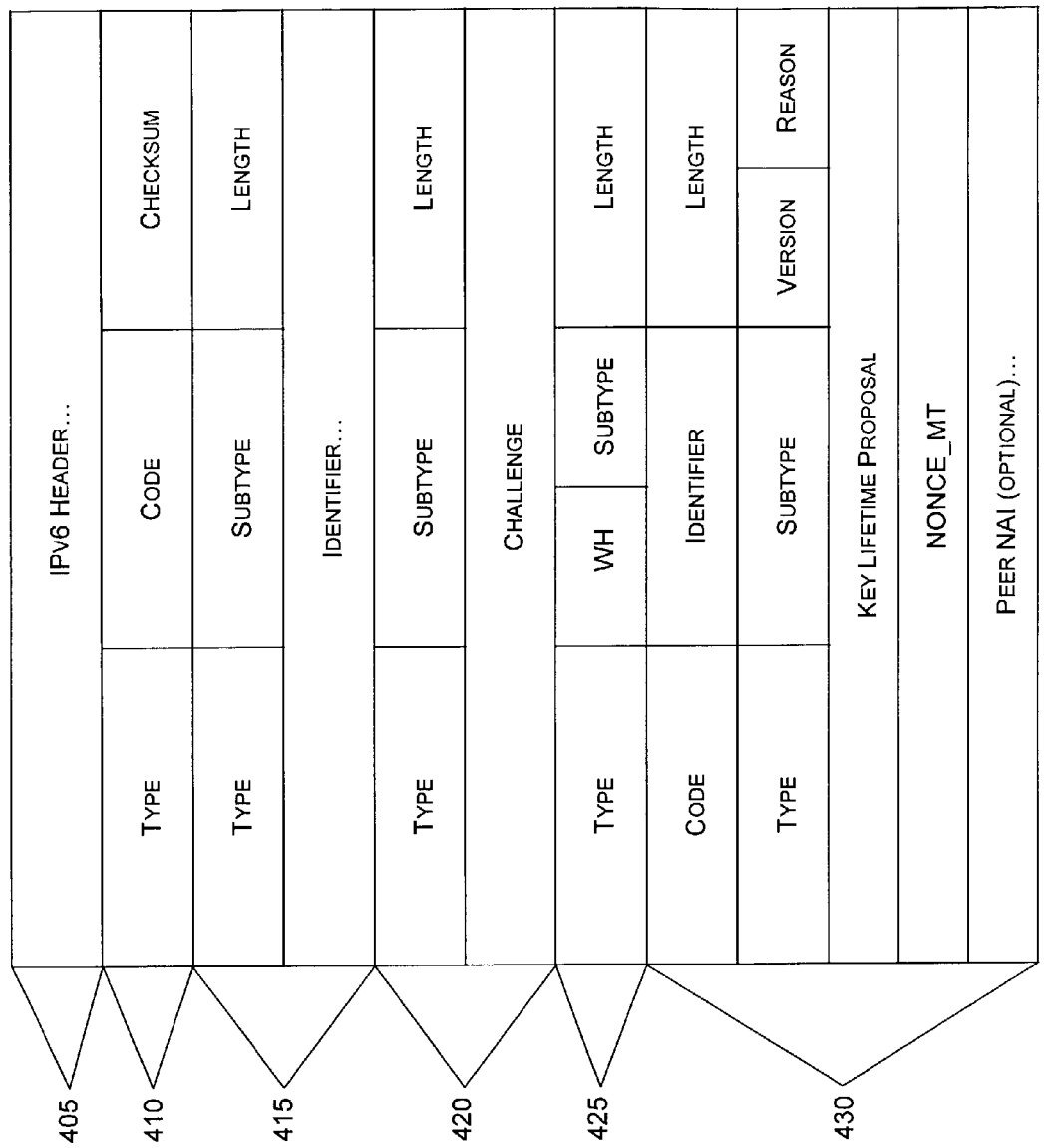
FIG. 4 shows a message that a mobile node can send to initiate a Subscriber Identity Module (SIM) authentication procedure.

FIG. 4 shows a message that a mobile node can send to initiate a SIM authentication procedure, according to one embodiment of the invention. The message includes. In this example, the message is an AAAv6 request containing an embedded data option, which is an EAP response packet. This EAP packet is a "response" because this SIM authentication procedure is extracted from a larger message flow which would include PPP-EAP signaling sent in an earlier message.

The message includes IPv6 header 405, ICMPv6 header 410, AAA client identifier option 420, AAAv6 challenge option 425, and AAAv6 embedded data option 430. IPv6 header 405 may include a source address (SRC) that indicates that the message is coming from a mobile node. It may include a destination address (DEST) that indicates that the message is directed to an AAAv6 attendant. IPv6 header 405 may also include a next header field (NxtHDR) with a value of 58 that indicates that the message is an ICMPv6 message.

ICMPv6 header 410 may include a type field, a code field, and a checksum field. A value of 151 (or 91 hex) in the type field may indicate that the message is an AAAv6 request. A value of 0 in the code field may indicate another option associated with the AAAv6 request. The checksum field may be used to verify that the message was not corrupted during transit. The checksum may be calculated as known to those skilled in the art.

AAA client identifier option 420 may include a type field, a subtype field, a length field, and an identifier field. A value of 1 in the type field may indicate that this is a client identifier option. A value of 0 in the subtype field may indicate that the identifier is a Network Access Identifier (NAI). The length field may indicate the length of the identifier. The length may be indicated in octets. The identifier field may be constructed using the GSM's assigned IMSI and a special realm as understood by those skilled in the art.

AAAv6 challenge option 425 may include a type field, a subtype field, a length field, and a challenge field. A value of 3 in the type field may indicate that AAAV6 challenge option 425 is a challenge option. A value of 0 in the subtype field may indicate that the challenge is a local challenge. The length field may include the length of the challenge. This length may indicate the number of octets in the challenge. The challenge field may include the actual challenge data as picked from a router advertisement.

AAAv6 embedded data option 430 may include a type field, a WH field, a subtype field, a length field, and EAP-Response/SIM/Start 435. A value of 8 in the type field may indicated that AAAv6 embedded data option 430 is an embedded data option. A value of 10 in the WH field may indicate that the message involves an AAAH server. A value of 3 in the subtype field may indicate that the message includes an EAP response. The length field may include the length of AAAv6 embedded data option 430 in octets. It may also include the length of a peer NAI.

EAP-Response/SIM/Start 435 may be embedded into AAAv6 embedded data option 430. EAP-Response/SIM/Start 435 may be a packet that signifies the start of a SIM authentication procedure. EAP-Response/SIM/Start 435 may include a code field, an identifier field, a length field, a type field, a subtype field, a version field, a reason field, a key lifetime proposal fields, a NONCE_MT field, and a Peer NAI field.

A value of 2 in the code field may indicate that EAP-Response/SIM/Start 435 is a response. The identifier field may be used to match responses with requests as known to those skilled in the art. The length field may include the length of all data associated with an EAP extension. A value of 18 in the type field may indicate an EAP type for EAP/SIM authentication. A value of 1 in the subtype field may indicate SIM/Start.

The version field may indicate the EAP/SIM protocol version used. The reason field may include a bitmask that indicates, for bitmask 001, client-attendant authentication, for bitmask 010, client-attendant encrpytion, for bitmask 100, mobile node-home agent authentication, or any combination thereof, depending on the scope desired for the session key provided by SIM authentication. Employing bitmasks to represent combinations is known to those skilled in the art and is not discussed further here.

The key lifetime proposal field may include a client's key lifetime proposal in seconds. The NONCE_MT may include a random number generated by a client that may be used as a seed value for a new key. The random number may be 16 bytes in length or some other length, depending on the application desired.

The peer NAI field can be used to describe a service to authorize. An authentication gateway receiving this field may send sends two key replies. One of the key replies may be sent towards the client and may not include the key. While not including the key, it may include enough information for the client to generate the key using its SIM module. The other key may be sent towards a peer node where the realm of the Peer NAI encodes routing of the key reply to the peer node over the core signaling protocol.

Figure 5:
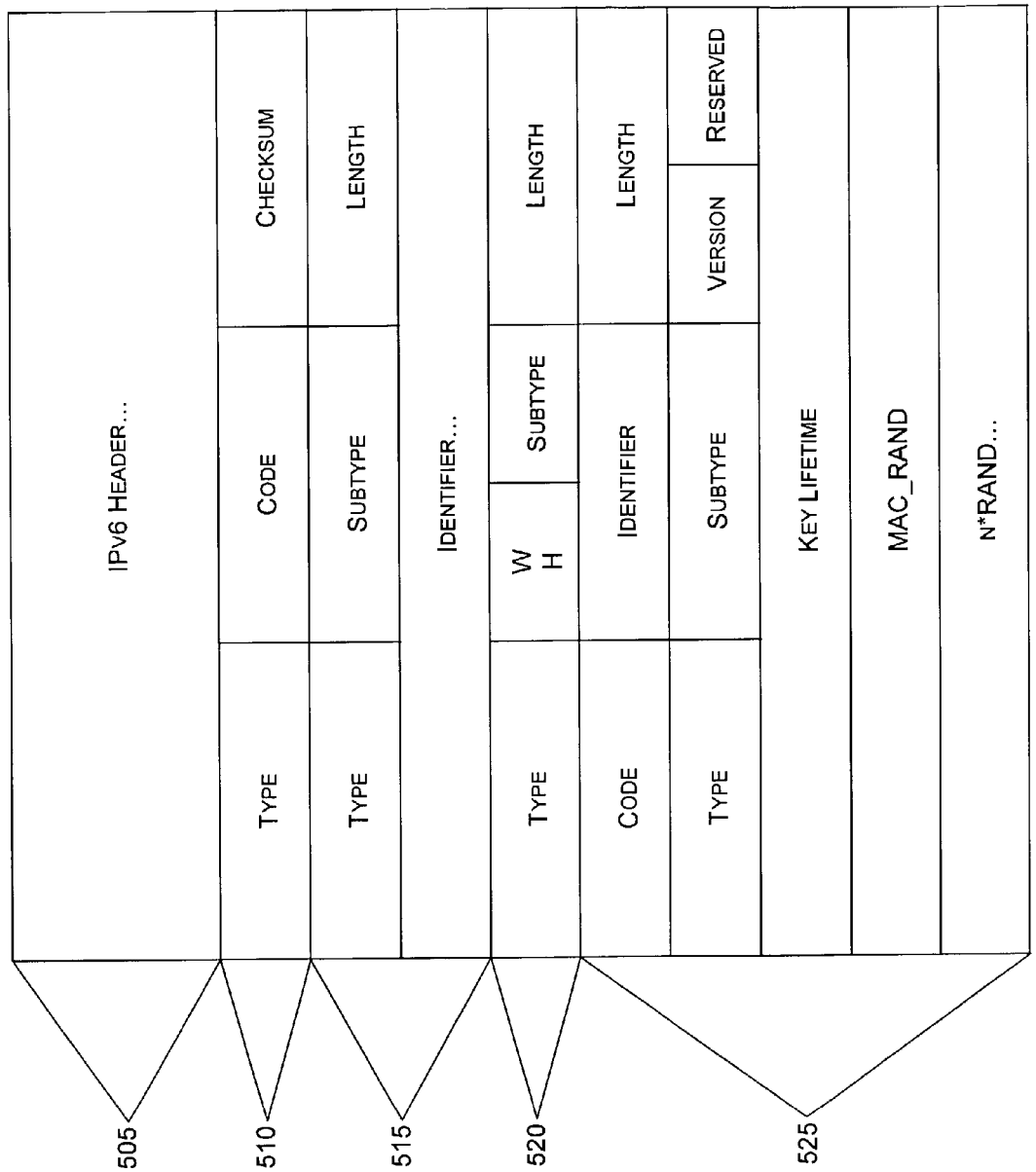
FIG. 5 shows a message in which random numbers are provided to the mobile node.

FIG. 5 shows a message in which random numbers are provided to the mobile node, according to one embodiment of the invention. The random number may be protected using a message authentication code. The message may be provided as an AAAv6 reply in response to the message shown in FIG. 4.

The message may include IPv6 header 505, ICMPv6 header 510, AAA client identifier option 515, and AAAv6 embedded data option 520. IPv6 header 505 may include a source address (SRC) that indicates that the message is coming from a local attendant. It may include a destination address (DEST) that indicates that the message is directed to a mobile node. IPv6 header 505 may also include a next header field (NxtHDR) with a value of 58 that indicates that the message is an ICMPv6 message.

ICMPv6 header 510 may include a type field, a code field, and a checksum field. A value of 153 (or 99 hex) in the type field may indicate that the message is an AAAv6 reply. A value of 0 in the code field may indicate another option associated with the AAAv6 request. The checksum field may be used to verify that the message was not corrupted during transit. The checksum may be calculated as known to those skilled in the art.

AAA client identifier option 515 may include fields such as those included and described in conjunction with AAA client identifier option 420 of FIG. 4.

AAAv6 embedded data option 520 may include a type field, a WH field, a subtype field, a length field, and EAP-Request/SIM/Start 525. A value of 8 in the type field may indicated that AAAv6 embedded data option 520 is an embedded data option. A binary value of 00 in the WH field may indicate that the recipient of AAA Protocol message, e.g., a client or attendant, should process embedded data. A value of 2 in the subtype field may indicate that the message includes an EAP request. The length field may include the length of EAP-Request/SIM/Start 525 in octets.

EAP-Request/SIM/Start 525 may be embedded into AAAv6 embedded data option 520. EAP-Request/SIM/Start 525 may include a code field, an identifier field, a length field, a type field, a subtype field, a version field, a reserved field, a key lifetime field, a MAC_RAND field, and a random numbers.

A value of 1 in the code field may indicate that EAP-Request/SIM/Start 525 is a request. The identifier field may be used to match responses with requests as known to those skilled in the art. The length field may include the length of all data associated with the EAP extension. The length field will include the number of RAND challenges given in the EAP request. A value of 18 in the type field may indicate an EAP type for EAP/SIM authentication. A value of 2 in the subtype field may indicate SIM/Challenge.

The version field may indicate the EAP/SIM protocol version used. The key lifetime field includes the remaining key lifetime in seconds. This is a lifetime decided by an AAA server. The AAA Server may, but is not required to, take into account the client's key lifetime proposal from EAP-Response/GSMSIM/Start. Typically, the key lifetime is greater than zero.

The MAC_RAND field is a message authentication code for the n random numbers passed (n*RAND) and Key Lifetime. The MAC_RAND field may be defined by a pseudo-random function PRF(n*Kc, n*RAND|NONCE_MT|Lifetime), where nKC are the n session keys. It may be, for example, 16 octets in length.

The random numbers field (N*RAND) may include n GSM RANDs of 16 bytes each. A value of n=2 is used in some embodiments of the invention.

Figure 6:
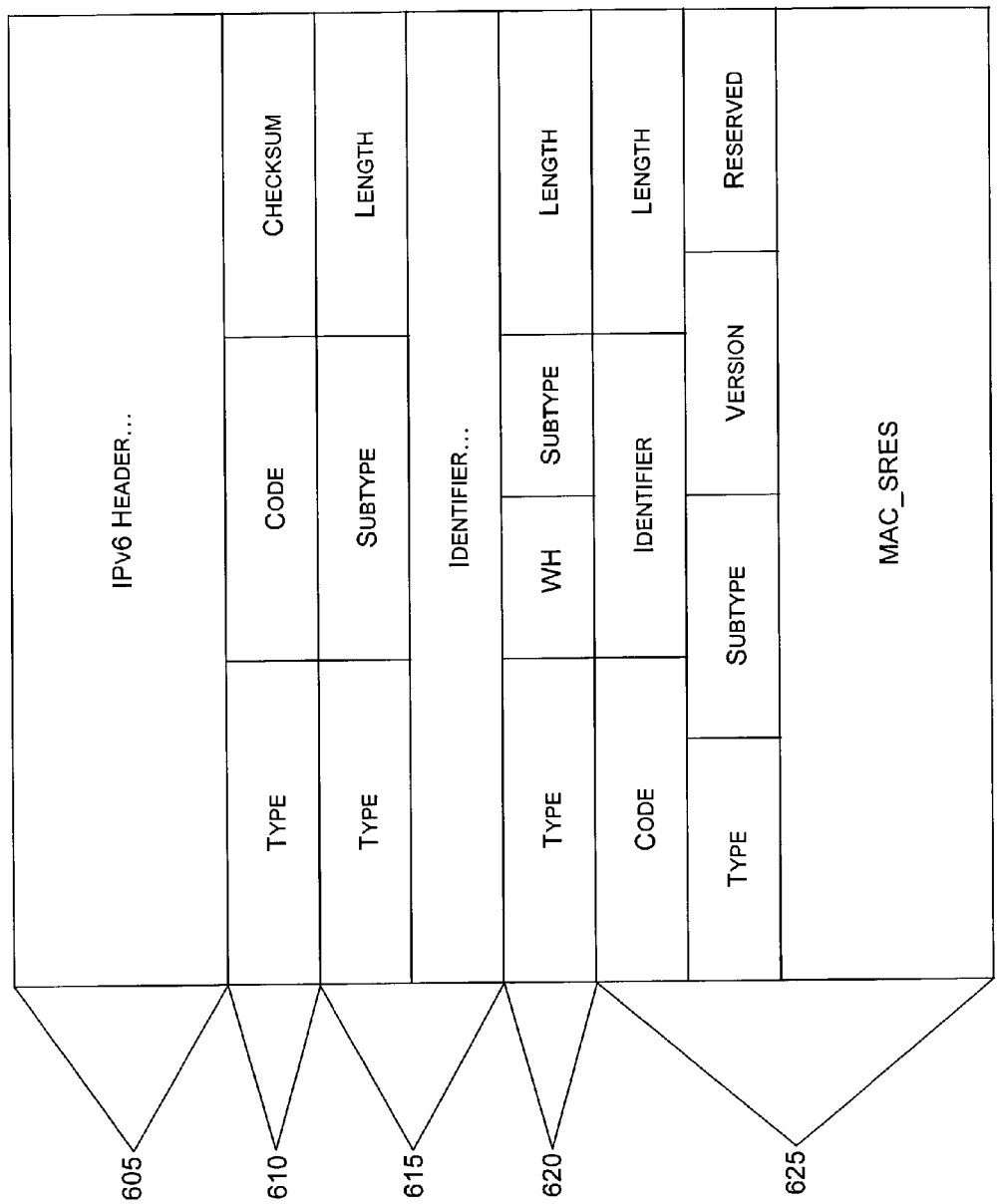
FIG. 6 shows a message that is a response to an authentication challenge.

FIG. 6 shows a message that is a response to an authentication challenge, according to one embodiment of the invention. The MAC_SRES field is provided as a hash of the responses produced by a SIM module so the original responses are not explicit in the message. An authentication gateway can use the same hash to check validity of the response.

The message may include IPv6 header 605, ICMPv6 header 610, AAA client identifier option 615, and AAAv6 embedded data option 620. IPv6 header 605 may include a source address (SRC) that indicates that the message is coming from a mobile node. It may include a destination address (DEST) that indicates that the message is directed to a local attendant. IPv6 header 605 may also include a next header field (NxtHDR) with a value of 58 that indicates that the message is an ICMPv6 message.

ICMPv6 header 610 may include a type field, a code field, and a checksum field. A value of 151 (or 97 hex) in the type field may indicate that the message is an AAAv6 request. A value of 0 in the code field may indicate another option associated with the AAAv6 request. The checksum field may be used to verify that the message was not corrupted during transit. The checksum may be calculated as known to those skilled in the art.

AAA client identifier option 615 may include fields such as those included and described in conjunction with AAA client identifier option 420 of FIG. 4.

AAAv6 embedded data option 620 may include a type field, a WH field, a subtype field, a length field, and EAP-Response/SIM/Challenge 625. A value of 8 in the type field may indicated that AAAv6 embedded data option 620 is an embedded data option. A binary value of 10 in the WH field may indicate that an AAAH server should process embedded data. A value of 3 in the subtype field may indicate that the message includes an EAP response. The length field may include the length of EAP-Response/SIM/Challenge 625 in octets.

EAP-Response/SIM/Challenge 625 may be embedded into AAAv6 embedded data option 620. EAP-Request/SIM/Start 525 may include a code field, an identifier field, a length field, a type field, a subtype field, a version field, a reserved field, and a MAC_SRES field.

A value of 2 in the code field may indicate that EAP-Response/SIM/Start 625 is a response. The identifier field may be used to match responses with requests as known to those skilled in the art. The length field may include the length of all data associated with the EAP extension. The length field will include the number of RAND challenges given in the EAP request. A value of 18 in the type field may indicate an EAP type for EAP/SIM authentication. A value of 2 in the subtype field may indicate SIM/Challenge. The version field may indicate the EAP/SIM protocol version used. The MAC_SRES field may be calculated by a client by using a pseudo-random function PRF(n*Kc, n*SRES|IMSI|NONCE_MT) [12] where n*Kc are the n session keys, n*SRES the n system responses obtained from the SIM card in the mobile node, IMSI its identifier, and NONCE_MT the nonce randomized by the mobile node. In one embodiment of the invention, the pseudo-random function generates a 16 octet number.

FIG. 7 shows a message that originates at the authentication gateway, according to one embodiment of the invention. A local attendant removes and keeps any key information distributed with the message. When this message arrives at the mobile node, it is used to indicate the success or failure of a SIM authentication session (for the indicated NAI), and the SPI which should be used in the mobile node's Security Policy Database (SPD). A session key is not carried over the last hop since the mobile node already has the session key, generated locally by the SIM algorithm. An AAAv6 key reply option thus has no key field; it conveys status to the mobile node.

The message may include IPv6 header 705, ICMPv6 header 710, AAA client identifier option 715, and AAA generalized key reply option 720. IPv6 header 705 may include a source address (SRC) that indicates that the message is coming from a local attendant. It may include a destination address (DEST) that indicates that the message is directed to a local attendant. IPv6 header 705 may also include a next header field (NxtHDR) with a value of 58 that indicates that the message is an ICMPv6 message.

ICMPv6 header 710 may include a type field, a code field, and a checksum field. A value of 153 (or 99 hex) in the type field may indicate that the message is an AAAv6 reply. The code field may be used to indicate success or failure of the protocol. For example, a value of 0 may indicate that authorization succeeded. A value of 50 may indicate invalid credentials such as a bad MAC_SRES. The checksum field may be used to verify that the message was not corrupted during transit. The checksum may be calculated as known to those skilled in the art.

AAA client identifier option 715 may include fields such as those included and described in conjunction with AAA client identifier option 420 of FIG. 4.

AAA generalized key reply option 720 includes a type field, a subtype field, a length field, a AAAH SPI field, and a key SPI field. A value of 4 in the type field may indicate that AAA generalized key reply option 720 is a key reply. The subtype field may depend on the scope of the key established. For example, it may include a bitmask value similar to the reason field bitmask values described in conjunction with FIG. 4.

The length field may include the length of AAA generalized key reply option 720. In one embodiment of the invention, the length field includes the length of AAA generalized key reply option 720 except the first four octets.

The AAAH SPI field is not used and may be ignored by a mobile node. The key SPI field indicates the security association between the mobile node and AAAH which should be used by the client to interpret the generated key. Note that the encoded key field is not sent with this message, as the key can be generated at the mobile node.

Figure 10:
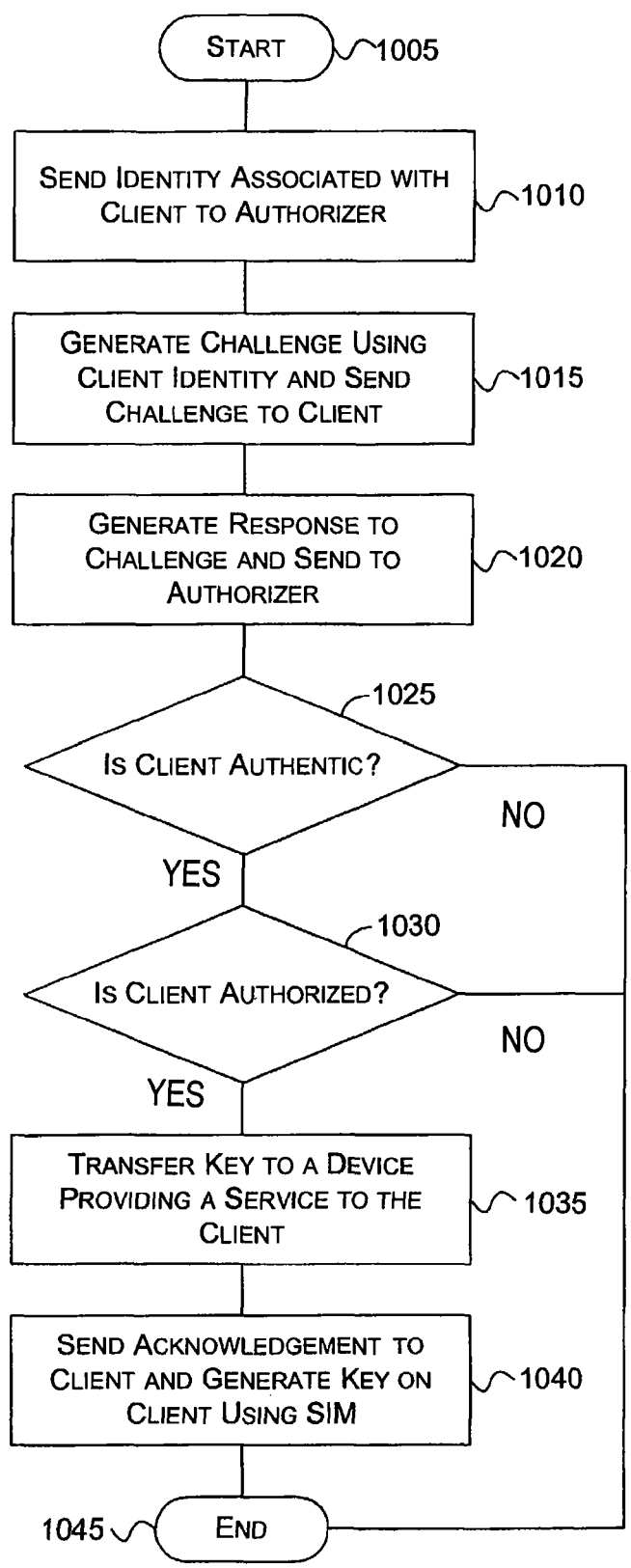
FIG. 10 illustrates a flow chart for using a three party model in accordance with the invention.

FIG. 10 illustrates a flow chart for using a three party model, according to one embodiment of the invention. The process begins at block 1005 when a client is ready to request a service, for example. After block 1005, processing continues at block 1010.

At block 1010, an identity associated with the client is sent to an authorizer. The identity may be an IMSI as discussed previously. After block 1010, processing continues at block 1015.

At block 1015, a challenge is generated using the identity received and the challenge is sent to the client. The challenge is a random number created using credentials known to the client and the authorizer. After block 1015, processing continues at block 1020.

At block 1020, a response to the challenge is generated and sent to the authorizer. When the client is not an imposter, the client knows the credentials that allow it to respond to the challenge in such a way as to prove the client's identity. After block 1020, processing continues at block 1025.

At block 1025, the authorizer determines if the client is authentic. If the client is authentic, processing continues at block 1030; otherwise, processing continues at block 1045. An authorizer may determine if a client is authentic by comparing a received challenge with the challenge the authorizer sent. If the challenges do not match, the authorizer may determine that the client is not authentic and may discard the response.

At block 1030, a determination is made as to if the client has authority to access the resource requested. If so, processing continues at block 1035; otherwise, processing continues at block 1045. The authorizer may consult, for example, a database to determine whether the client should be given access to the resource requested. If the client does not have authority, the authorizer may discard the response.

At block 1035, a key is transferred to a device associated with a resource requested by the client. The resource may be, for example, access to a network. The key may indicate to the device that the client is authorized to access the resource. After block 1035, processing continues at block 1040.

At block 1040, an acknowledgement is sent to the client and the client generates a key using a SIM. It should be noted that the key does not need to be sent to the client as it can generate the key using its SIM. After block 1040, processing continues at block 1045. At this point, the client may begin communicating with the device to access the resource.

At block 1045, processing ends. The process above may be repeated each time a client wishes to access a resource.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system comprising:
   (a) an authorizer configured to:
      determine if a client is authorized to access a resource associated with a request for that resource, said authorizer being configured to receive an identity associated with said client and an indication of the requested resource,
      generate a challenge based on said identity,
      send said challenge to the client,
      receive a response from the client,
      in response to receiving the response, determine whether the client is authorized to access the resource by comparing the challenge to the response, and if the client is authorized to access the resource, send a key associated with the requested resource to a peer,
      receive a binding acknowledgment from the peer, and
      in response to receiving the binding acknowledgment, send a key reply to the client;
   (b) the client configured to generate the response to said challenge based on the client identity and the challenge and to send said response to said authorizer, said client comprising a subscriber identity module, said client being configured to have a local subscriber identity module generated session key associated with said resource;
   (c) the peer for providing the resource to the client, the peer configured to:
      receive the key from the authorizer, and
      in response to receiving the key, send the binding acknowledgment to the authorizer; and
   (d) a local attendant configured to:
      receive a solicitation from the client,
      in response to receiving the solicitation from the client, send a local challenge to the client,
      in response to receiving a correct response to the local challenge, the identity, and credentials from the client, forward the identity and credentials to the authorizer,
      receive the identity and a key reply from the authorizer, and
      in response to receiving the identity and the key reply from the authorizer, send a status of authentication and the key reply to the client.

2. The system of claim 1, wherein the peer is arranged to provide access to a network.

3. The system of claim 1, wherein the peer is arranged to provide a service to the client.

4. The system of claim 1, wherein the peer is a home agent of the client.

5. The system of claim 1, wherein the local attendant is an access router.

6. The system of claim 1, wherein the local attendant is an Internet Protocol version 6 (IPv6) router.

7. The system of claim 1, wherein the local attendant is arranged to communicate with at least one AAA server.

8. A method comprising:
   (a) sending an identity associated with a client and an indication of a requested resource to an authorizer;
   (b) generating, by the authorizer, a challenge that is calculated using the client identity;
   (c) sending the challenge to the client;
   (d) generating, by the client, a response employing the client identity and the challenge;
   (e) sending the response to the authorizer;
   (f) comparing, by the authorizer, the challenge to the client response;
   (g) determining, by the authorizer, whether the client is authorized to access the resource;
   (h) when it is determined that the client is authorized to access the resource, transferring, by the authorizer, a key associated with the resource to a peer for providing the resource to the client;
   (i) in response to receiving the key, sending, by the peer, a binding acknowledgment to the authorizer;
   (j) in response to receiving the binding acknowledgment, sending, by the authorizer, a key reply to the client;
   (k) receiving a solicitation by a local attendant from the client;
   (l) in response to receiving the solicitation from the client, sending a local challenge from the local attendant to the client;
   (m) in response to receiving a correct response to the local challenge, the identity, and credentials from the client, forwarding the identity and credentials from the local attendant to the authorizer;
   (n) receiving the identity and a key reply by the local attendant from the authorizer; and (o) in response to receiving the identity and the key reply from the authorizer, sending a status of authentication and the key reply from the local attendant to the client;

wherein the key is the same as a local subscriber identity module generated session key associated with said resource, which is generated by the client by employing information stored on a subscriber identity module associated with the client.

9. The method of claim 8, wherein each message between the authorizer and the client passes through the local attendant.

10. The method of claim 9, wherein the authorizer, the client, and said peer are each in separate domains, wherein each domain is defined as a set of one or more entities such that if the set includes more than one entity, a connection between any two of the entities in the set can be secured by said keys.

11. The method of claim 8, wherein the sending the identity includes sending the identity associated with the client to the authorizer using Internet Protocol version 6 (IPv6).

12. An apparatus comprising:
an authorizer configured to:
receive an identity associated with a client and an indication of a requested resource;
generate a challenge that is calculated using the identity associated with the client;
send the challenge to the client;
receive a response from the client based on the identity and the challenge;
compare the challenge to the response;
determine whether the client is authorized to access the resource;
when it is determined that the client is authorized to access the resource, send a key associated with the resource to a peer for providing the resource to the client, wherein the key is the same as a local subscriber identity module generated session key associated with said resource, which is generated by the client employing information stored on a subscriber identity module of the client;
receive a binding acknowledgment from the peer; and
in response to receiving the binding acknowledgment, send a key reply to the client; and
a local attendant configured to:
receive a solicitation from the client;
in response to receiving the solicitation from the client, send the challenge to the client on behalf of the authorizer;
in response to receiving a correct response to the local challenge, the identity, and credentials from the client, forward the identity and credentials to the authorizer;
receive the identity and a key reply from the authorizer; and
in response to receiving the identity and the key reply from the authorizer, send a status of authentication and the key reply to the client on behalf of the authorizer.

13. The system of claim 1, wherein the authorizer is configured to operate in accordance with Internet Protocol version 6 (IPv6).

14. The system of claim 1, further comprising the local attendant that is accessible to the authorizer and the client, the local attendant comprising a server for forwarding messages between the client and the authorizer, wherein the authorizer, local attendant, and the device on which the resource may be accessed are each in separate domains, wherein each domain is defined as a set of one or more entities such that if the set includes more than one entity, a connection between any two of the entities in the set can be secured by said keys, wherein said authorizer is configured to authorize said service.

15. The system of claim 1, wherein said client is an Internet Protocol version 6 (IPv6) host.

16. The apparatus of claim 12, wherein the apparatus is configured to acknowledge that the sending of said key is complete.

17. The apparatus of claim 12, wherein the apparatus is configured to receive an identity associated with the client in accordance with Internet Protocol version 6 (IPv6).

* * * * *